United States Patent [19]
Jones

[11] Patent Number: 5,162,171
[45] Date of Patent: Nov. 10, 1992

[54] METAL OXIDE-HYDROGEN BATTERY HAVING MODULES EXTENDING LONGITUDINALLY OF THE PRESSURE VESSEL

[75] Inventor: Kenneth R. Jones, Oconomowoc, Wis.

[73] Assignee: Globe-Union Inc., Milwaukee, Wis.

[21] Appl. No.: 783,152

[22] Filed: Oct. 28, 1991

[51] Int. Cl.⁵ .............................................. H01M 10/50
[52] U.S. Cl. ....................................... 429/101; 429/120
[58] Field of Search ................... 429/101, 120, 26, 27, 429/34

[56] References Cited

U.S. PATENT DOCUMENTS

| | | |
|---|---|---|
| 3,669,744 | 6/1972 | Tsenter et al. |
| 4,189,527 | 1/1980 | Stadnick et al. ...................... 429/26 |
| 4,327,158 | 4/1982 | Holleck ............................... 429/101 |
| 4,477,540 | 10/1984 | Miller et al. .......................... 429/27 |
| 4,517,264 | 5/1985 | Miller et al. ......................... 429/163 |
| 4,683,178 | 7/1987 | Stadnick et al. ..................... 429/101 |
| 4,820,597 | 4/1989 | Lim et al. .............................. 429/50 |
| 4,923,769 | 5/1990 | Jones et al. ......................... 429/101 |
| 4,957,830 | 9/1990 | Jones ................................... 429/101 |

Primary Examiner—Anthony Skapars
Attorney, Agent, or Firm—Andrus, Sceales, Starke & Sawall

[57] ABSTRACT

A metal oxide-hydrogen battery having an outer sealed pressure vessel including a generally cylindrical shell. A plurality of generally rectangular cell modules are disposed in the shell and extend longitudinally of the shell. Each cell module has at least one positive electrode and a negative electrode. Separating the cell modules are heat transfer fins composed of a material having a high coefficient of thermal conductivity. The opposed edges of each fin are provided with flexible flanges that engage and complement the inner surface of the cylindrical pressure vessel shell and serve to transfer heat from the cell modules to the vessel shell.

17 Claims, 2 Drawing Sheets

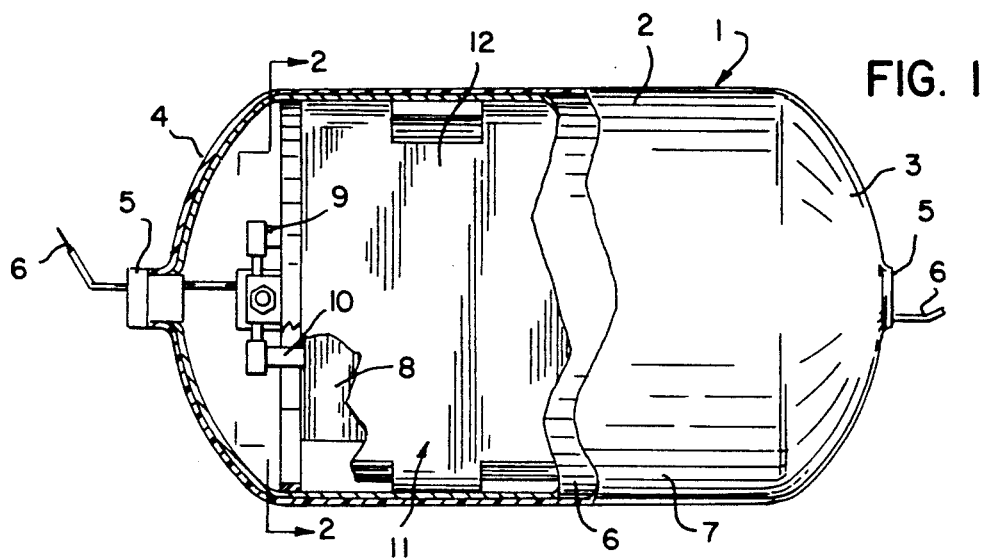
FIG. 1
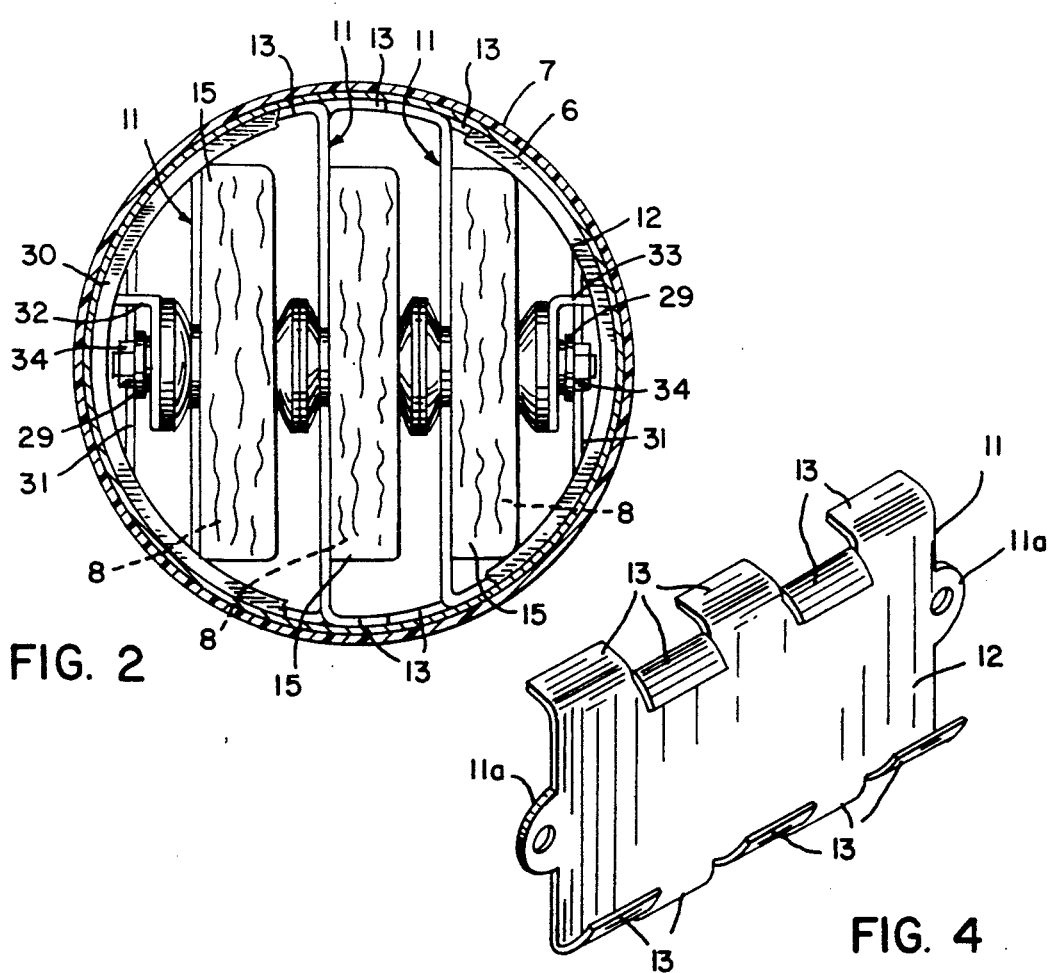
FIG. 2
FIG. 4

METAL OXIDE-HYDROGEN BATTERY HAVING MODULES EXTENDING LONGITUDINALLY OF THE PRESSURE VESSEL

BACKGROUND OF THE INVENTION

Metal oxide-hydrogen batteries, such as nickel oxide-hydrogen batteries, have seen wide use in aerospace applications. Batteries of this type are rechargeable and have an extremely long cycle life and provide a high uniform output during the entire discharge cycle.

A nickel oxide-hydrogen battery has a further advantage in that the pressure in the battery can be used as a quantitative indication of the state of charge. In addition, batteries of this type have an inherent overcharge protection.

In the typical nickel oxide-hydrogen battery, the positive electrodes are generally in the form of flat porous sintered nickel plaques, impregnated with nickel hydroxide, while the negative electrodes are formed from a thin fine mesh nickel screen having a catalyst such as platinum, bonded to one surface of the screen through a hydrophobic polymeric material, such as polytetrafluoroethylene. On discharge of the battery, hydrogen gas diffuses through the electrolyte surrounding the catalyst surfaces of the negative plates and becomes dissociated by the catalyst to the monatomic form. The monatomic hydrogen is ionized and combined with hydroxyl ions to form water with an electron being released in the process of forming each hydrogen ion.

In addition, hydroxyl ions are formed at the positive electrode by the reaction of water with the available oxygen component of the nickel oxide. As a result of these reactions, an electron current is produced in the exterior circuit.

On recharging the reaction is reversed, with the recharging being characterized by the regeneration of hydrogen gas at the negative electrode and the reoxidation of the nickel hydroxide as the positive electrode.

Due to the gas pressures involved, the nickel oxide-hydrogen battery is contained within an outer pressure vessel.

The typical metal oxide-hydrogen battery consists of a number of cell modules, each cell module preferably composed of a pair of back-to-back positive electrodes spaced apart by a separator layer, along with a negative electrode disposed adjacent and separated from each positive electrode. Typically a group of cell modules are contained within a single vessel and installations of this type are commonly referred to as "CPV" (common pressure vessel). In a conventional CPV installation a group of cell modules, which are generally rectangular in configuration, are mounted within a cylindrical pressure vessel with the cell modules extending transversely of the axis of the vessel. With this construction there is a substantial gap or space between the sides of the cell modules and the inner wall of the vessel. With a nickel oxide-hydrogen battery, heat is generated in both the charging and discharging cycles and it is important that heat be transferred to the outer vessel and hence to the surrounding atmosphere. Due to the spacing of the rectangular cell modules from the cylindrical vessel, heat transferred to the vessel is minimal with the result that the performance of the battery can be adversely affected.

U.S. Pat. No. 4,957,830 is directed to an improved metal oxide-hydrogen battery in which each cell module is semi-circular in planar configuration and the cell modules are stacked in side-by-side relation to provide a semi-cylindrical stack with the curved peripheral edges of the stack disposed adjacent the inner surface of the vessel, while the straight or chordwise ends of the cell modules are sealed and disposed in opposed relation to the sealed ends of a second stack of cell modules. In addition, heat transfer sheets formed of a thermally conductive material can be positioned flatwise between adjacent cell modules with the outer peripheral edge of the sheet in contact with the inner surface of the vessel to improve heat transfer to the pressure vessel.

While the construction shown in U.S. Pat. No. 4,957,830 substantially improves heat transfer to the outer pressure vessel, the construction requires that the semi-circular positive and negative electrodes be cut from strip stock with the result that there is substantial scrappage of the expensive electrode material which increases the overall cost of the battery.

SUMMARY OF THE INVENTION

The invention relates to an improved rechargeable metal oxide-hydrogen battery. The battery includes a generally cylindrical outer pressure vessel that houses a stack of generally rectangular cell modules, the cell modules being oriented so that they extend longitudinal of the vessel.

Each cell module is formed of a pair of back-to-back positive electrodes spaced apart by a separating layer, and a negative electrode having a hydrophilic surface is disposed adjacent each positive electrode and separated therefrom by a separator layer. An electrolyte, such as a potassium hydroxide solution, is impregnated in the separator layers and is in contact with the positive and negative electrodes.

Separating each cell module is a heat transfer fin or plate formed of a material having a high coefficient of thermal conductivity. Each heat transfer fin includes a generally flat body portion which is disposed flatwise between adjacent cell modules and the opposed or outer edges of each fin are provided with laterally extending, flexible flanges which engage and complement the inner cylindrical surface of the pressure vessel. The flanges can either extend the full length of the fins or can be interrupted. The interrupted nature of the flanges provides greater flexibility for the flanges which enable the flanges to follow the vessel diameter increase when the vessel is pressurized.

A plurality of metal tabs are connected to the edges of the positive and negative electrodes of each cell module and the tabs are connected by conductor bars in a manner to obtain the desired voltage or amperage output for the battery. The conductor rods also extend through openings in the ends of the heat transfer fins and through openings in support members which are attached to the pressure vessel and extend transversely of the vessel axis. The attachment of the conductor rods to the supports serves to stabilize the cell modules and prevent longitudinal shifting of the cell modules within the pressure vessel.

The invention enables the electrodes of the cell modules to have a rectangular configuration, enabling the electrodes to be cut from coil stock with minimum scrappage and thus reducing the overall cost of the battery.

The heat transfer fins not only aid in transferring heat from the cell modules to the vessel wall, but also serve to prevent lateral shifting of the cell modules within the vessel.

The flanges on the heat transfer fins provide increased surface contact with the wall of the pressure vessel and also serve to stabilize the stack of cell modules.

Other objects and advantages will appear during the course of the following description.

DESCRIPTION OF THE DRAWINGS

FIG. 1 is a side elevation of the nickel oxide-hydrogen battery of the invention with parts broken away in section;

FIG. 2 is a section taken along line 2—2 of FIG. 1;

FIG. 4 is a perspective view of a heat transfer fin;

DESCRIPTION OF THE ILLUSTRATED EMBODIMENT

Figure 3:
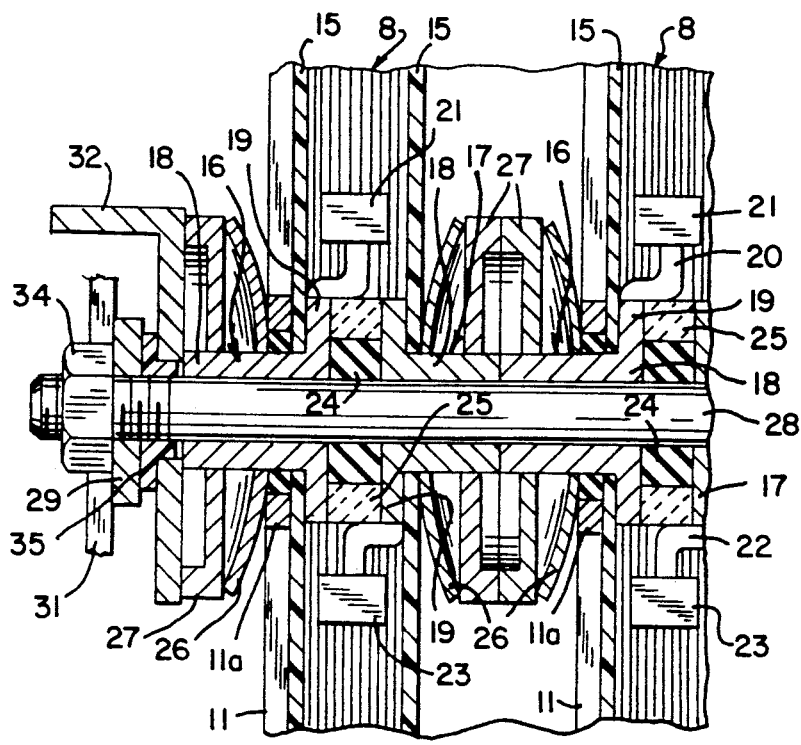
FIG. 3 is an enlarged fragmentary view showing the connection of the cell modules.

The drawings illustrate an improved metal oxide-hydrogen battery, such as a nickel oxide-hydrogen battery. The battery includes an outer pressure vessel 1 composed of a generally cylindrical shell 2, the ends of which are enclosed by dome shaped heads 3 and 4. A metal fitting 5 is mounted within an opening in heads 3,4 and electrical leads 6, which connect the battery to an exterior circuit, extend outwardly in sealed relation through fittings 5. In other installations the two leads can extend outwardly through one fitting 5.

Vessel 1 may be constructed in the manner set forth in U.S. Pat. No. 4,923,769 and the description of that patent application is incorporated herein by reference. As disclosed in the aforementioned patent, vessel 1 comprises in general an inner liner 6 which is impermeable to hydrogen gas and is normally formed of a corrosion resistant metal such as Inconel, and an outer layer of fiber reinforced thermosetting resin 7 which is wound around the metal liner 6 and is capable of withstanding the internal pressures generated within vessel 1.

The battery includes a plurality of cell modules 8 which are stacked in side-by-side relation. Cell modules 8 are generally rectangular in configuration and extend longitudinally of the axis of vessel 1.

Each cell module can be constructed as described in U.S. Pat. No. 4,957,830 and includes a pair of back-to-back positive electrodes which are spaced apart by a separator layer. A negative electrode is located adjacent the opposite face of each positive electrode and is separated therefrom by separator layers. Diffuser screens are located on the outer surfaces of the negative electrodes. An electrolyte, which can take the form of an aqueous solution of potassium hydroxide is impregnated into the separator layers.

The construction of modules 8 is conventional and, in itself, does not form part of the present invention. The positive electrodes are typically formed of sintered nickel plaques impregnated with nickel hydroxide. The plaques can be formed by pressing nickel powder and a suitable binder, such as methylcellulose, into plate form and then sintering the pressed mixture to burn off the binder so as to render the plate porous. The sintering preferably is done by a hydrogen atmosphere at a suitable temperature in the range of about 900° C. The plaques are then impregnated with nickel hydroxide by immersing the plaques in an aqueous nickel nitrate solution and then making the plaques cathodic in an aqueous potassium hydroxide electrolyte, whereby the nickel nitrate is cathodized to nickel hydroxide. The impregnated plaques are then washed to remove any residual nitrate and the nickel hydroxide is oxidized to a trivalent state by anodizing in an alkaline electrolyte, such as aqueous potassium hydroxide.

The negative electrodes are typically constructed of relatively thin nickel screens coated on one side with a layer of platinum intermixed and bonded by a suitable hydrophobic plastic matrix material, such as Teflon (polytetrafluoroethylene). The hydrophobic polymeric backing avoids the loss of electrolyte due to the entrainment of the electrolyte in the hydrogen gas produced by the negative electrode during charging.

The separator layers can be formed of a porous polymeric material, such as polypropylene mat, or alternately, fuel cell grade asbestos or potassium titanate can be employed.

Metal tabs 9 are spot welded or otherwise secured to an edge of each positive electrode and similarly tabs 10 are secured to the corresponding edges of the negative electrodes. Tabs 9 and 10 extend toward head 4, as seen in FIG. 1, and are connected in an electrical circuit as will be hereinafter described.

With a metal oxide-hydrogen battery, heat is generated in both the charging and discharging cycles. To transfer heat from the cell modules 8 to the pressure vessel 1, heat transfer fins 11 are positioned between each pair of cell modules. Heat transfer fins are formed of a material having a high coefficient of thermal conductivity and can take the form of a metal such as aluminum, copper, beryllium copper, or the like which will not react with the electrolyte, or can be formed of a nonmetallic material such as carbon fibers.

Each fin 11 includes a flat body portion 12 which is located flatwise between adjacent cell modules 8 and the opposed edges of the body portion 12 are formed with a plurality of laterally extending flanges or tabs 13. As best shown in FIG. 3, flanges 13 extend in opposite directions from each end of the body 12 and are spaced apart along the length of the fin. The flanges 13 being flexible conform to the contour of the inner surface of shell 2 and the discontinuous nature of the flanges provides greater flexibility to enable the flanges to conform to shells that may be slightly out of round. In addition, the side edges of each fin 11 are provided with apertured tabs 11a.

When the fins 11 are inserted in the vessel, the flanges 13 will be flexed inwardly and will tend to spring back into tight engagement with the vessel wall. The flexible nature of the flanges enables the flanges to follow expansion of the vessel diameter when the vessel is pressurized to thereby maintain surface contact between the flanges and the vessel.

Each cell module can be contained within a flexible sealed bag 15, preferably formed of a thermoplastic resin. Bag 15 is impervious to the passage of the liquid electrolyte and prevents the electrolyte from one cell module from migrating to an adjacent cell module and thereby bridging the cells. Bag 15 is preferably a multilayer structure composed of a central layer of nylon film sandwiched between outer layers of polyethylene. The nylon film provides strength for the bag, while the polyethylene layers aid in heat sealing the bag to provide a sealed structure.

To permit the flow of gas between the cell modules and the interior of the pressure vessel 1, each bag 15 is provided with one or more vents, not shown. The vents are permeable to the flow of gas but impermeable to the flow of the liquid electrolyte so that the electrolyte cannot pass through the vents to the exterior of the bag.

To connect the cell modules 8 together, a pair of conductors 16 and 17 are associated with each cell module. Each conductor 16,17 includes a cylindrical sleeve section 18 which extends through a hole in tab 11a of fin 11 and through a hole in bag 15, and a flange 19 which extends radially from the sleeve and is located within the bag. An arm 20 extends radially from flange 19 of each conductor 16 and carries a comb 21 that is connected to tabs 9 that extend outwardly from the edge of the positive electrodes of each cell module 8. Similarly, an arm 22 projects from flange 19 of each conductor 17 and carries a comb 23 that is connected to tabs 10 of the negative electrodes of the cell module.

As best shown in FIG. 3, the flanges 19 of the conductor 16,17 of each cell modules are insulated from each other by an inner washer 24 formed of an electrically insulating material, such as nylon, and an outer washer 25 which can be formed of a ceramic material. The ceramic washers 25 being rigid will prevent excess compression of the nylon washers 24 when the entire mechanism is compressed axially, as will be hereinafter described.

A Bellville washer 26 is disposed around the cylindrical sleeve section 18 of each of the conductors 16,17. One end of each washer 26 bears against an annular metal seat 27, while the opposite end of each washer force will tabs 11a of fins 11 and the portion of the bag 15 bordering the hole therein against the flange 19 of the respective conductor. The outer surface of each flange 19 can be provided with surface deviations, which tend to mechanically lock the bag 15 against the flange.

As best illustrated in FIG. 3, a tie rod 28 extends through the openings in the conductors 16 and 17, as well as through apertures in tabs 11a of fins 11 and through openings in bent tabs 29 on annular supports 30, which are located at the ends of the stack of cell modules. Tie rod 28 preferably composed of a central metal core and has an insulating outer coating formed of a material such as Teflon. With the conductors 16,17 assembled on the tie rod, the end of each positive conductor 16 will be in electrical contact with the abutting end of the next adjacent negative conductor 17.

The outer peripheral surface of each support 30 is attached by welding or the like to the liner 6 of shell 2. Each support 30 is provided with a pair of legs 31 which extend generally chordwise of the support and tab 29 extends laterally from each leg 31 and is generally normal to the plane of the support 30. As tie rods 28 extend through the openings in bent tabs 29 of supports 30, the cell modules 8 will be restrained against axial movement in vessel 1.

Positive and negative terminal brackets 32 and 33 are mounted on the ends of the tie rod 28 and nuts 34 are threaded on the ends of the tie rod, as shown in FIG. 3. An insulating washer 35 separates brackets 32,33, tie rod 28 and nuts 34.

As nuts 34 are tightened down on the tie rod 28, the Bellville washers 26 will be compressed to create an annular area of contact around each hole in the bag 15 to thereby tightly seal the bag to the flange 19 of the respective conductor 16 and 17. Through this sealing arrangement, migration of the electrolyte through the holes in the bag is eliminated, thus preventing the cell modules from drying out and also eliminating the possibility of shunt currents being developed which could cause premature failure of the battery.

Figure 5:
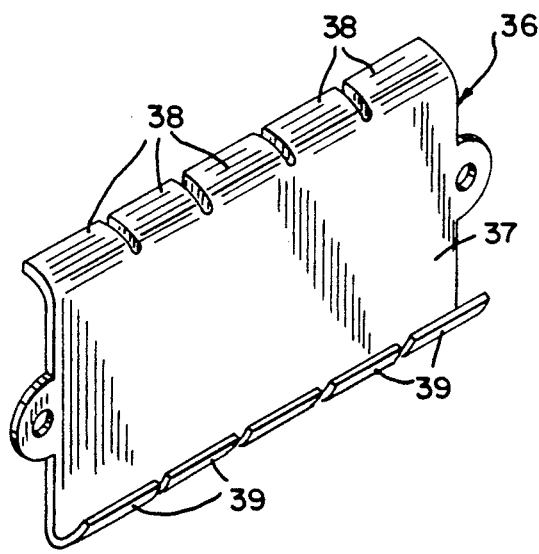
FIG. 5 is a perspective view of a modified form of heat transfer fin.

FIG. 5 shows a modified form of the heat transfer fins. In this embodiment, fin 36, similar in structure and function to fin 11 of the first embodiment, includes a flat body 37 and a series of spaced, flexible flanges or tabs 38 extend laterally in one direction from an end of body 37, while a second series of spaced flanges 39 extend laterally in the opposite direction from the other end of the body.

Figure 6:
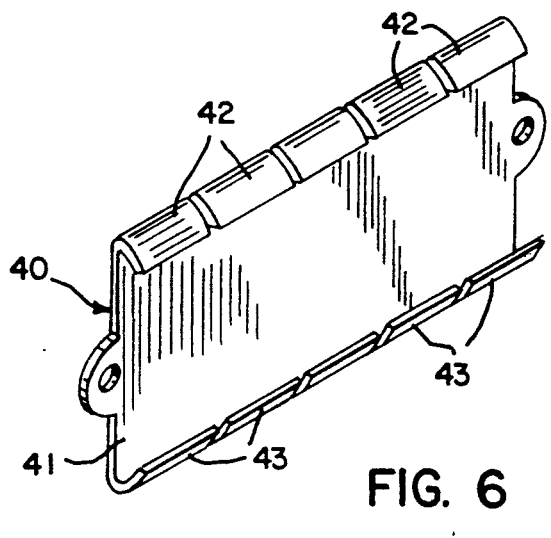
FIG. 6 is a perspective view of a second modified form of heat transfer fin.

FIG. 6 illustrates a further modified form of the fin. In this embodiment, the fin 40 has a flat body 41 and flexible flanges 42 and 43 extend laterally in the same direction from opposite ends of the body.

Through use of the invention, rectangular electrodes can be utilized in the cell modules 8 and the use of the rectangular modules substantially reduces the cost of the battery over other configurations which result in substantial scrappage of the electrode material.

The heat transfer members 11, 36 and 40 improve the heat transfer from the cell modules 8 to the vessel 1, thereby improving the operational efficiency of the battery and lengthening the service life. In addition, the flanges or tabs on the heat transfer fins provide an increased surface contact with the vessel wall to improve the heat transfer and also serve to stabilize the stack of cell modules within the vessel. As the flanges are flexible, they will follow outward expansion of the vessel as the vessel is pressurized with hydrogen gas.

Various modes of carrying out the invention are contemplated as being within the scope of the following claims particularly pointing out and distinctly claiming the subject matter which is regarded as the invention.

I claim:

1. In a metal oxide-hydrogen battery, an outer pressure vessel including a generally cylindrical shell, at least one cell module disposed in said shell and including a positive electrode and a negative electrode, said cell module being generally rectangular in shape and extending longitudinally of the axis of the shell, heat transfer means disposed flatwise on a side of said cell module and having opposed ends disposed in engagement with the inner surface of said cylindrical shell, said heat transfer means being composed of a material having a high coefficient of thermal conductivity for transferring of heat from said cell module to said shell.

2. The battery of claim 1, and including flexible flanges on said opposed ends of said heat transfer means each flange being disposed in contact with the inner surface of said shell.

3. The battery of claim 2, and including a pair of said flanges on each of said opposed ends, the flexible flanges on each end extending laterally of said heat transfer means in opposite directions.

4. The battery of claim 1, wherein said heat transfer means comprises a flat body portion and flanges disposed on opposed ends of said body portion, flanges on each end extending laterally of said body portion in opposite directions and disposed in biased contact with the inner surface of said shell.

5. The battery of claim 2, wherein each flange is provided with at least one discontinuity to divide said flange into a plurality of flange sections, said flange sections being flexible and characterized by the ability to follow variations in diameter of said shell.

6. The battery of claim 1, and including electrical connecting means for connecting said electrodes in an electrical circuit.

7. The battery of claim 1, and including means for preventing longitudinal displacement of said cell module in said shell.

8. The battery of claim 7, wherein said means for preventing longitudinal displacement comprises a support disposed at an end of said cell module, said support having a peripheral section secured to the shell and having a chordwise section secured to said cell module.

9. In a metal oxide-hydrogen battery, an outer pressure vessel including a generally cylindrical shell, a plurality of cell modules disposed in a side-by-side stacked relation in said shell, said cell modules being generally rectangular in configuration and extending longitudinally of said shell, each cell module including a positive electrode and a negative electrode, a heat transfer fin disposed flatwise between adjacent cell modules in said stack, each fin having a pair of opposed ends, a generally flexible flange on each of said opposed ends of each fin, said flanges being disposed in contact with the inner surface of said shell, and electrical connecting means connecting said electrodes in an electrical circuit.

10. The battery of claim 9, and including means for preventing longitudinal displacement of said cell modules in said shell.

11. The battery of claim 9, in which each of said ends has a pair of flanges, a first of said pair of flanges extending laterally in one direction from said end and a second of said pair of flanges extending laterally in the opposite direction from said end.

12. The battery of claim 9, wherein the flanges on said ends extend laterally in the same direction from the fin.

13. The battery of claim 9, wherein each flange comprises a plurality of spaced flange sections, said flange sections being flexible and being biased into contact with the inner surface of said shell, said flanges having the ability to follow expansion in diameter of said shell when said shell is pressurized.

14. The battery of claim 10, wherein said means for preventing longitudinal displacement of said stack of cell modules comprises a support disposed adjacent an end of said stack and having a peripheral portion secured to the inner surface of said shell and having a second section secured to said stack.

15. The battery of claim 14, wherein said electrical conducting means comprises a tie rod connected to said positive and negative electrodes and extending through an opening in said second section of said support.

16. In a metal oxide-hydrogen battery, an outer pressure vessel including a generally cylindrical shell, a plurality of cell modules disposed in side-by-side stacked relation in said shell, each cell module being generally rectangular in configuration and extending longitudinally of the axis of said shell, each cell module having a plurality of positive electrodes and a plurality of negative electrodes, each cell module including a pair of opposed first edges extending parallel to the axis of said shell and a pair of opposed second edges connecting said first edges and extending transversely of said axis, a heat transfer fin disposed flatwise between each adjacent pair of cell modules with each fin having opposed ends projecting beyond the first edges of said cell modules, a flexible flange connected to each of said ends of said fins and disposed in engagement with the inner surface of said cylindrical shell, a plurality of positive tabs connected to the positive electrodes of each cell module, a plurality of negative tabs connected to the negative electrodes of each cell module, said tabs projecting beyond the second edges of said cell modules, electrical connecting means extending transversely of the shell and connecting said tabs in an electrical circuit, and support means interconnecting said electrical connecting means and said shell for preventing longitudinal displacement of said cell modules within said shell, said support means being insulated from said electrical conducting means.

17. The battery of claim 16, wherein said support means has a generally circular outer section engaged with the inner surface of the shell, and a pair of parallel legs extending chordwise of said outer surface and attached to said electrical conducting means.

* * * * *

UNITED STATES PATENT AND TRADEMARK OFFICE
CERTIFICATE OF CORRECTION

PATENT NO. : 5,162,171
DATED : November 10, 1992
INVENTOR(S) : KENNETH R. JONES

It is certified that error appears in the above-indentified patent and that said Letters Patent is hereby corrected as shown below:

Col. 6, Line 53, CLAIM 2 After "means" insert --,-- (comma);
Col. 7, Line 17, CLAIM 9 Cancel "stacked relation" and substitute therefor --stack--

Signed and Sealed this

Twenty-eighth Day of June, 1994

Attest:

BRUCE LEHMAN

*Attesting Officer*  *Commissioner of Patents and Trademarks*